United States Patent
Motin et al.

(10) Patent No.: US 11,760,317 B2
(45) Date of Patent: Sep. 19, 2023

(54) SYSTEM AND METHOD FOR CONTROLLING AN ELECTRONIC PARKING BRAKE

(71) Applicant: Ford Global Technologies, LLC, Dearborn, MI (US)

(72) Inventors: Abdul Motin, Detroit, MI (US); Rahat Khan, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 497 days.

(21) Appl. No.: 17/000,119

(22) Filed: Aug. 21, 2020

(65) Prior Publication Data

US 2022/0055581 A1  Feb. 24, 2022

(51) Int. Cl.
  *B60T 7/12* (2006.01)
  *B60T 17/22* (2006.01)

(52) U.S. Cl.
  CPC ............... *B60T 7/12* (2013.01); *B60T 17/22* (2013.01); *B60T 2201/10* (2013.01); *B60T 2260/04* (2013.01); *B60T 2270/10* (2013.01)

(58) Field of Classification Search
  CPC ........ B60T 7/12; B60T 17/22; B60T 2201/10; B60T 2260/04; B60T 2270/10
  USPC .......................................................... 701/70
  See application file for complete search history.

(56) References Cited

U.S. PATENT DOCUMENTS

| | | | |
|---|---|---|---|
| 6,909,956 B2 | 6/2005 | Weed et al. | |
| 8,948,965 B2 | 2/2015 | Liu et al. | |
| 9,035,591 B2 | 5/2015 | Sim | |
| 9,308,906 B2 | 4/2016 | Hilberer | |
| 9,387,840 B1 * | 7/2016 | Cahill | B64C 25/426 |
| 9,409,552 B2 * | 8/2016 | Sundaram | B60L 7/26 |
| 9,694,800 B2 | 7/2017 | Zula et al. | |
| 10,065,620 B2 | 9/2018 | No | |

(Continued)

FOREIGN PATENT DOCUMENTS

| | | | | |
|---|---|---|---|---|
| CN | 105539585 A | * | 5/2016 | ............ B60W 40/04 |
| CN | 107709113 A | * | 2/2018 | ............ B60T 13/746 |

(Continued)

OTHER PUBLICATIONS

Slosarczyk, et al.; Implementation of an Electronic Park Brake Feature with Limited Data Availability; Sep. 3, 2008; 2008 19th International Conference on Systems Engineering; pp. 254-259 (https://ieeexplore.ieee.org/document/4616646) (Year: 2008).*

(Continued)

*Primary Examiner* — Atul Trivedi
(74) *Attorney, Agent, or Firm* — Burr & Forman LLP; Lorne Forsythe (57) ABSTRACT

The present disclosure relates to a vehicle having a park-by-brake module that can control an electronic parking brake coupled to the rear wheels of a vehicle. The park-by-brake module is coupled to an antilock brake module by a controller area network architecture. In one example, a first controller area network and a second controller area network are used to couple the park-by-brake module to the antilock brake module. The controller area network architecture allows the park-by-brake module to receive commands from various control modules. Based on the received commands, the park-by-brake module activates or deactivates the electronic parking brake.

20 Claims, 5 Drawing Sheets

(56) References Cited

U.S. PATENT DOCUMENTS

| | | | |
|---|---|---|---|
| 10,286,891 B2* | 5/2019 | Joyce | B60T 7/12 |
| 10,421,456 B2* | 9/2019 | Khafagy | F02N 11/0822 |
| 10,501,080 B2* | 12/2019 | Khafagy | B60T 7/122 |
| 10,589,738 B1* | 3/2020 | Boecker | B60W 30/02 |
| 10,821,948 B2* | 11/2020 | Fridman | B60T 7/12 |
| 2003/0006644 A1* | 1/2003 | MacGregor | B60T 13/261 303/3 |
| 2014/0067221 A1 | 3/2014 | Sundaram et al. | |
| 2014/0309900 A1* | 10/2014 | Frashure | B60T 8/17 701/70 |
| 2015/0019099 A1 | 1/2015 | Imai et al. | |
| 2015/0158470 A1* | 6/2015 | Choi | B60Q 1/48 701/2 |
| 2016/0109024 A1* | 4/2016 | Capita | B60T 1/062 701/69 |
| 2016/0304067 A1* | 10/2016 | Gajulapalli | B60T 8/1705 |
| 2017/0166173 A1* | 6/2017 | Lauffer | B60T 7/12 |
| 2017/0349154 A1 | 12/2017 | Ryu | |
| 2018/0043867 A1* | 2/2018 | Lemmer | B60T 13/662 |
| 2018/0043876 A1* | 2/2018 | Houtman | B60T 8/885 |
| 2018/0050672 A1* | 2/2018 | Pennala | B60T 8/17 |
| 2018/0056963 A1* | 3/2018 | Krueger | B60T 13/741 |
| 2018/0237016 A1* | 8/2018 | Khafagy | B61H 1/00 |
| 2019/0047537 A1 | 2/2019 | Choi | |
| 2019/0113409 A1* | 4/2019 | Schoenfuss | G05G 25/00 |
| 2019/0135249 A1* | 5/2019 | Fridman | F16D 55/226 |
| 2019/0168730 A1* | 6/2019 | Park | F16H 63/3458 |
| 2021/0078557 A1* | 3/2021 | Kobune | B60T 13/741 |
| 2021/0269001 A1* | 9/2021 | Suzuki | B60T 8/329 |
| 2022/0055581 A1* | 2/2022 | Motin | B60T 7/12 |
| 2022/0073038 A1* | 3/2022 | Suzuki | F16D 65/18 |
| 2022/0194349 A1* | 6/2022 | Hingst | B60T 13/74 |
| 2022/0355771 A1* | 11/2022 | Fujita | B60T 13/02 |
| 2023/0126047 A1* | 4/2023 | Kojima | H02K 7/06 318/473 |
| 2023/0129690 A1* | 4/2023 | Lee | B60R 17/221 701/34.4 |

FOREIGN PATENT DOCUMENTS

| | | | | |
|---|---|---|---|---|
| CN | 209351355 U | | 9/2019 | |
| CN | 112109690 A | * | 12/2020 | B60T 17/22 |
| DE | 102021208306 A1 | * | 2/2022 | B60T 1/065 |
| DE | 102022203940 A1 | * | 10/2022 | F16D 65/18 |
| DE | 112020006080 T5 | * | 10/2022 | B60T 13/74 |
| GB | 2508690 A | * | 6/2014 | B60G 17/015 |
| JP | 2019130939 A | * | 8/2019 | F23R 3/40 |
| JP | 2019157921 A | * | 9/2019 | |
| KR | 20220015343 A | * | 2/2022 | B60T 17/22 |
| WO | WO-2007144238 A1 | * | 12/2007 | B60T 7/22 |
| WO | WO-2019163597 A1 | * | 8/2019 | B60T 13/662 |
| WO | WO-2020158587 A1 | * | 8/2020 | B60T 13/74 |
| WO | WO-2020241637 A1 | * | 12/2020 | B60T 7/12 |
| WO | WO-2021125652 A1 | * | 6/2021 | B60T 7/12 |

OTHER PUBLICATIONS

Slosarczyk, et al.; Implementation of an Electronic Park Brake Feature with Limited Data Availability; Sep. 3, 2008; 2008 19th International Conference on Systems Engineering; pp. 254-259 (https://ieeexplore.ieee.org/document/4616646).*

* cited by examiner

SYSTEM AND METHOD FOR CONTROLLING AN ELECTRONIC PARKING BRAKE

TECHNICAL FIELD

The present disclosure is directed to electronic parking brake systems provided in a vehicle.

BACKGROUND

Many vehicles employ a Park-By-Wire (PBW) system for performing various parking operations including, but not limited to, putting the vehicles in park. The PBW system communicates with various other communication modules, such as a transmission control module (TCM) or a powertrain control module (PCM), to perform parking operations. Typically, a PBW system includes a hardware module known as an Integrated Park Module (IPM) to perform these operations. The IPM includes a traditional park gear, a hold/release solenoid controlled by an electrical signal, a park pawl, and a park rod. Due to a fault in the hold/release solenoid or a fault in the TCMs, the PBW system may cause an unintended park operation. In addition, the IPM may occupy a considerable space in the vehicle.

BRIEF SUMMARY

The present disclosure relates to a system and a method for operating an electronic parking brake (EPB) of a vehicle. Embodiments of the present disclosure provide a robust system that can perform decision making related to parking operations without conventional park-by-wire hardware modules such as an IPM. Additionally, embodiments of the present disclosure ensure that parking operations are successfully carried out even in case of failure of existing in-vehicle networks, such as one or more controller area networks (CAN).

In one embodiment, a vehicle includes a park-by-brake module that can make decisions to control an electronic parking brake of the vehicle. The park-by-brake module is coupled to an antilock brake module that, in turn, is coupled to the electronic parking brake. The electronic parking brake is further coupled to the rear wheels of the vehicle. The park-by-brake module can send one or more commands to the antilock brake module. The antilock brake module controls the electronic parking brake to initiate a parking brake state responsive to the commands received from the park-by-brake module.

In one embodiment, the park-by-brake module is able to communicate with the antilock brake module via either of a first controller area network and a second controller area network. During standard operation, the park-by-brake module communicates with the antilock brake module via the first controller area network. If the first controller area network is unavailable, the park-by-brake module can communicate with the antilock brake module via the second controller area network.

In one embodiment, a method includes receiving, in a park-by-brake module of a vehicle, signals from one or more control modules of the vehicle. The method includes processing, with the park-by-brake module, the signals received from the one or more control modules. The method includes controlling an electronic parking brake by sending control signals from the park-by-brake module to an antilock brake module coupled to the electronic parking brake.

In one embodiment, a method includes sending a first command from a park-by-brake module of a vehicle to an antilock brake module of the vehicle via one of a first controller area network and a second controller area network coupling the park-by-brake module to the antilock brake module. The method includes sending, responsive to the first command, a second command from the antilock brake module to an electronic parking brake of the vehicle. The method includes placing rear wheels of the vehicle in a parked condition with the electronic parking brake responsive to the second command.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles and braking systems have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Figure 1:
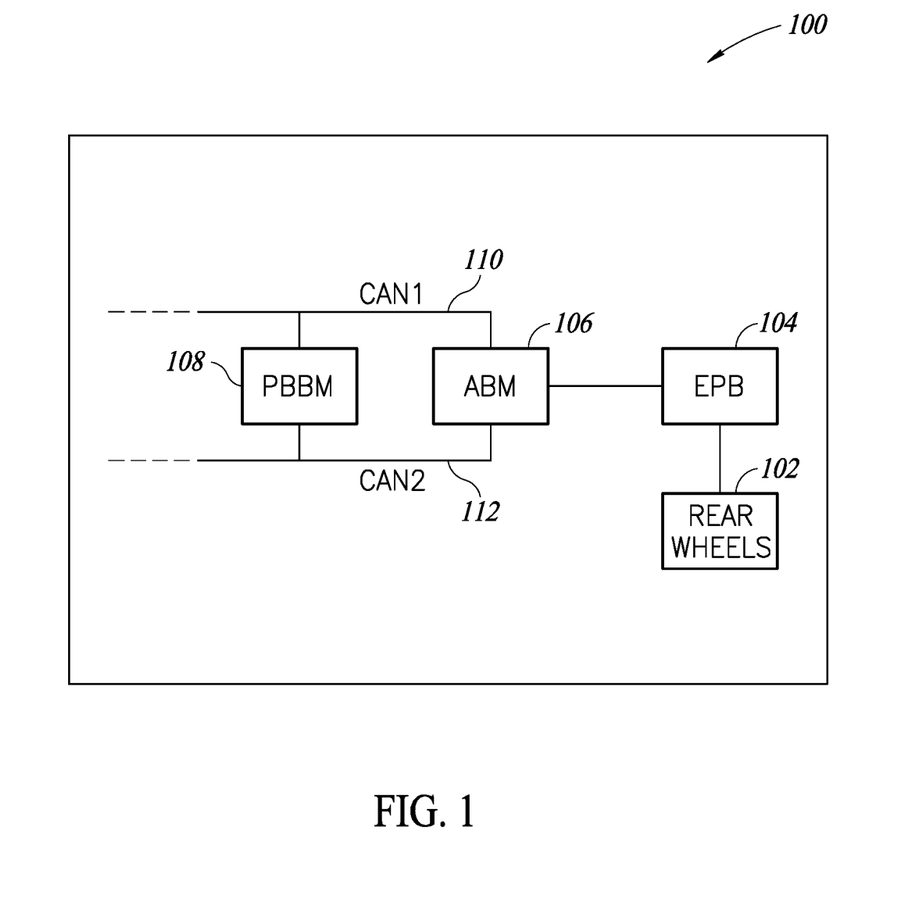
FIG. 1 is a block diagram of a vehicle, according to one embodiment of the present disclosure.

FIG. 1 is a block diagram of a vehicle 100, according to one embodiment of the present disclosure. The vehicle includes rear wheels 102, an electronic parking brake (EPB) 104, an antilock brake module (ABM) 106, and a park-by-brake module (PBBM) 108. The components of the vehicle 100 cooperate together to put the vehicle 100 into or out of a parked state.

The vehicle 100 may be any vehicle such as a car, a van, a bus, or other types of vehicles. The vehicle 100 may be a standard driver operated vehicle, an autonomous vehicle, or a semi-autonomous vehicle. The vehicle can include a combustion engine, an electric motor, or a hybrid powertrain.

In one embodiment, the vehicle 100 includes rear wheels 102 and one or more front wheels. In one example, the vehicle 100 includes two rear wheels. However, the vehicle 100 may include any suitable number of rear wheels. Similarly, the vehicle 100 may include any suitable number of front wheels. For instance, in case the vehicle 100 is a three-wheeled vehicle, the vehicle 100 may include two front wheels and a single rear wheel.

In one embodiment, vehicle 100 may include standard, driver-operated brakes (not illustrated) coupled to the rear wheels 102 and/or the front wheels. In one example, the brakes may include one or more hydraulic brakes, such as a disc brake and/or a drum brake. The brakes may be applied by a user to reduce the speed of the vehicle 100 or to keep the vehicle 100 stopped, for example while waiting at a stop sign.

The EPB 104 is utilized to place the vehicle 100 in park. The EPB 104 may be electro-mechanically coupled to the rear wheels 102 of the vehicle 100. The EPB 104 is configured to prevent the rear wheels 102 from moving when the vehicle 100 is in a parked state. While the present disclosure describes the EPB 104 as being coupled to the rear wheels 102, the EPB 104 may be coupled to the front wheels of the vehicle 100 either in combination with the rear wheels 102 or alone.

In one embodiment, the vehicle 100 may include a driver operated mechanism, such as a lever, a switch, a button, a pedal, or a knob, that enables the driver to activate or deactivate the EPB 104. Operating the mechanism may send a command to the EPB 104 to put the vehicle in park or to take the vehicle out of park. Additionally, the vehicle 100 may automatically transition the EPB 104 into one or more parking states and/or release the EPB 104 from the existing parking state. For instance, the EPB 104 may be released and may come out of the park state as soon as the user presses an accelerator pedal (not shown).

In one embodiment, the vehicle 100 utilizes the ABM 106 to prevent the rear wheels 102 and/or front wheels of the vehicle 100 from locking up when standard brakes are applied to slow down the vehicle. For example, when the driver presses a brake pedal of the vehicle 100 to decelerate while driving, the ABM 106 controls the function of the standard brakes to ensure that the brakes do not lock up the rear wheels 102. If the rear wheels lock up during deceleration of the vehicle, then the vehicle 100 may slide and the driver may lose control of the vehicle. The ABM prevents this from happening.

In one embodiment, the ABM 106 is coupled to the EPB 104. The ABM 106 may be electro-mechanically coupled to the EPB 104 or otherwise coupled to the EPB 104. The ABM 106 is configured to send commands to, or to otherwise control the function of the EPB 104. The ABM 106 activates or deactivates the EPB 104, or otherwise causes the EPB 104 to switch between parking states or maintain a current parking state. For instance, the ABM 106 may send one or more commands to the EPB 104 to release, prevent, or enable motion of the rear wheels 102. As used herein, activating the EPB 104 can include causing the EPB to put the vehicle 100 in park. As used herein, deactivating the EPB 104 can include causing the EPB to take the automobile out of park.

In one embodiment, the ABM 106 includes one or more memories and one or more processors. The one or more memories store instructions for performing antilock brake functions and for controlling the EPB 104. The one or more processors execute the instructions stored in the one or more memories.

According to one embodiment of the present disclosure, the PBBM 108 determines how the EPB 104 should be operated. The PBBM 108 determines whether or not the EPB 104 should be activated, deactivated, or maintained in a current state. As will be described in more detail below, the PBBM 108 can determine what the state of EPB 104 should be based on signals received from one or more other modules or components of the vehicle 100.

In one embodiment, the PBBM 108 is coupled to the ABM 106. The PBBM 108 controls the ABM 106 with regards to EPB 104. The PBBM 108 commands the ABM 106 to cause the EPB 104 to change or maintain the one or more parking states. The PBBM 108 sends commands or signals to the ABM 106 to cause the EPB 104 to activate, deactivate, or maintain a current parking state.

In one embodiment, the PBBM 108 is coupled to the ABM 106 via an in-vehicle network such as a controller area network (CAN) bus. The CAN bus allows the two modules PBBM 108 and ABM 106 to communicate with each other. Details pertaining to the CAN, coupling the PBBM 108 to the ABM 106, are provided later. During operation, the PBBM 108 may send commands or signals via the CAN to the ABM 106 to transition and/or release the parking state of the vehicle 100. In response to the received commands, the ABM 106 may change the parking state of the EPB 104.

In one embodiment, the PBBM 108 is coupled to the ABM 106 by a first controller area network 110 (hereinafter referred to as CAN1 110) and a second controller area network 112 (hereinafter referred as CAN2 112). CAN1 110 and CAN2 112 may be data communication protocols that allow the PBBM 108 and the ABM 106 to communicate with each other. The presence of both CAN1 110 and CAN2 112 ensures that PBBM 108 can communicate with the ABM 106 in the event that either CAN1 110 or CAN2 112 is unavailable.

In one embodiment, the PBBM 108 is configured to communicate with the ABM 106 via the CAN1 110. In one example, CAN1 110 is a high-speed CAN bus that communicatively couples the PBBM 108 with the ABM 106. CAN1 110 may also communicatively couple the PBBM 108 to one or more other modules of the vehicle 100. For example, the PBBM 108 may communicate with a powertrain control module (PCM) and/or a hybrid powertrain control module (HPCM) via the CAN1 110. It may be noted that the high-speed CAN bus may have a baud rate from 40 Kbps to up to 1 Mbps. However, those skilled in the art will appreciate that the high-speed CAN bus may have any baud rate suitable to couple the PBBM 108 with the ABM 106.

In another embodiment, the PBBM 108 communicates with the ABM 106 via the CAN2 112. The PBBM 108 may communicate with the ABM 106 via the CAN2 112 when the CAN1 110 is not available. Accordingly, the PBBM 108 may communicate with the ABM 106 via CAN1 110 by default and via CAN2 112 if CAN1 110 is not available. In this case, CAN2 112 is a dedicated CAN that ensures communication between the PBBM 108 and the ABM 106 to enact and/or initiate a parking state of the EPB 104 when CAN1 110 is not available. CAN2 112 may be dedicated solely for communication between the PBBM 108 and the ABM 106.

In one embodiment, CAN1 may become unavailable for a variety of reasons. For example, CAN1 may be busy carrying other communication signals. In another example, CAN1 may be unavailable due to being in a fault condition. Those skilled in the art will understand that the fault condition of the CAN1 may arise for various reasons. Exemplary reasons may include physical damage or disruption of the CAN, a short-circuited CAN, a software issue associated with the CAN, poor signal quality across the CAN, or for other reasons.

As discussed in detail in subsequent figures, the PBBM 108 may be coupled to one or more other modules of the vehicle 100 including, but not limited to, a gear shift module (GSM), a body control module (BCM), a powertrain control module (PCM), and a hybrid powertrain control module (HPCM). In one embodiment, the PBBM 108 may receive one or more input signals from the one or more modules such that the PBBM 108 may decide to transition and/or release the parking state of the EPB 104 based on the received input signals. In another embodiment, the PBBM 108 may independently decide and/or control the release and/or transition the parking state of the EPB 104. It should be note that the signal may be, for example, a command, a control signal, or another type of signal.

In one embodiment, the PBBM 108 includes one or more memories and one or more processors. The one or more memories are configured to store software instructions defining operating parameters of the PBBM 108. The one or more processors are configured to execute the software instructions. The software instructions can include steps for determining if one or more CAN buses are faulty or otherwise unavailable for routing commands to the one or more modules of the vehicle 100, such as the ABM 106. Furthermore, the software instructions may define steps for generating and sending a command to the ABM 106 for transitioning and/or releasing the parking state of the EPB 104 responsive to input signals received by the ABM 106.

In one example, the PBBM 108 sends a command to the ABM 106 to change the parking state of the EPB 104. It may be contemplated that the command received from the PBBM 108 may include a single command or a combination of commands. The ABM 106 may send a command to the EPB 104 responsive to the command received from the PBBM 108. The command from the ABM 106 causes the EPB 104 to place the rear wheels 102 of the vehicle 100 in a parked condition. The vehicle 100 of the present disclosure uses a dedicated module, i.e., the PBBM 108, to decide and transition the EPB 104 between the various parking states. Therefore, the vehicle 100 does not need the conventional Integrated Park Module (IPM) for performing parking operations. Using the PBBM 108 to control the parking state of the EPB 104 is advantageous in many ways. For example, the PBBM 108 works on the communication network of the vehicle 100 and does not require substantial changes to the CAN architecture (discussed in detail in FIGS. 2-4) of the vehicle 100. Further, the conventional IPM based system is a hardware module that occupies a considerable space in the vehicle 100. Thus, replacing the IPM with the PBBM 108 saves space in the vehicle. Furthermore, the IPM may be affected by a fault in the transmission system of the vehicle 100, which may result in an unintended parking state of the EPB 104 or in a failure to put the vehicle 100 in a parked state. The PBBM 108 can improve the reliability of the parking brake of the vehicle 100.

Figure 2:
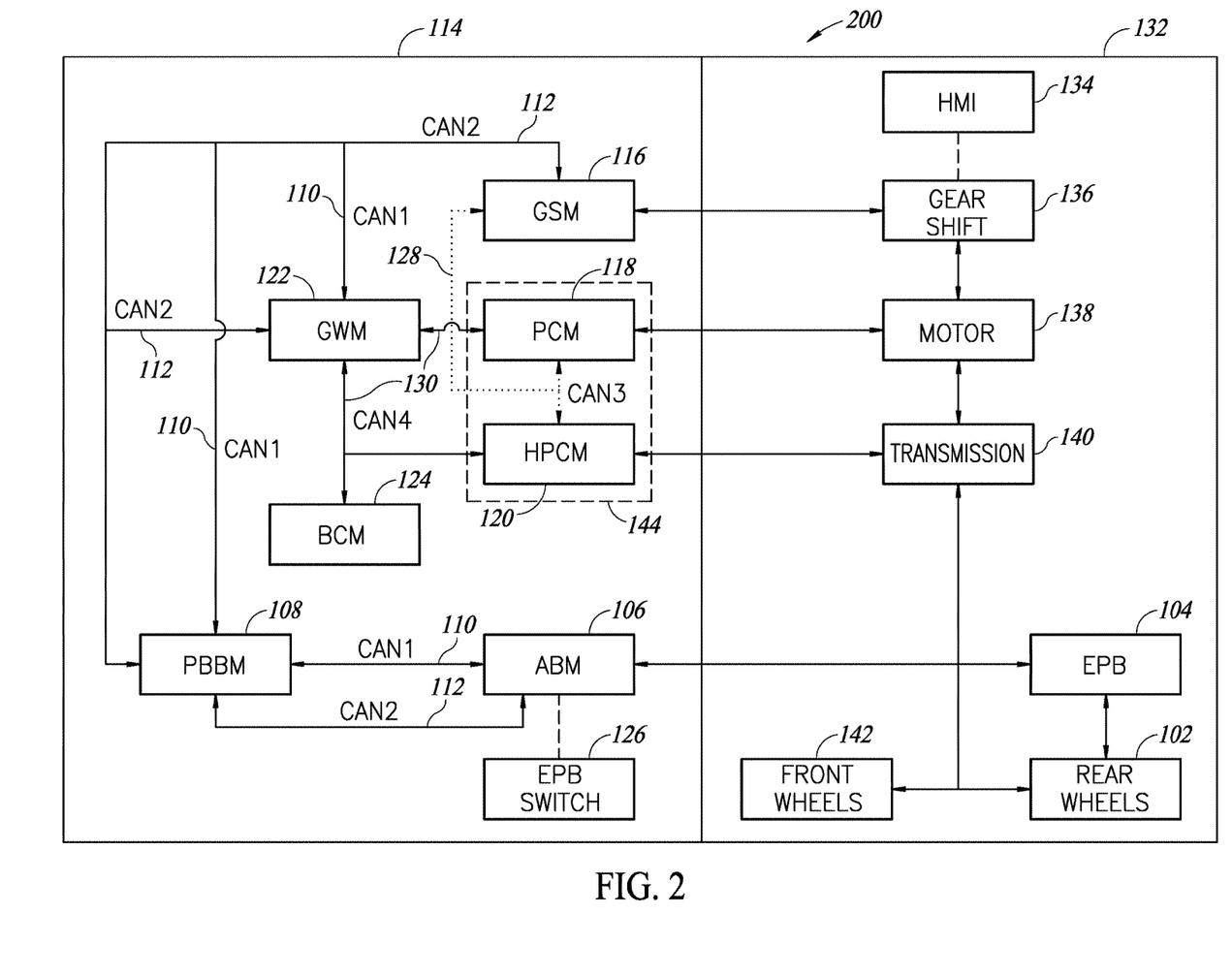
FIG. 2 is a block diagram of a vehicle, according to one embodiment of the present disclosure.

FIG. 2 is a block diagram of a vehicle 200, according to one embodiment. The vehicle includes a plurality of communication and control modules 114 and various hardware components 132. The communication and control modules 114 can communicate with each other and can send and receive signals to and from the hardware components 132.

In one embodiment, the communication and control modules 114 include an ABM 106, a PBBM 108, a gear shift module (GSM) 116, a control module 144, a gateway module (GWM) 122, and a body control module (BCM) 124. The control module 144 can include one or both of a powertrain control module (PCM) 118 and a hybrid powertrain control module 120. In one embodiment, the hardware components 132 can include rear wheels 102, an EPB 104 coupled to the rear wheels, front wheels 142, customer human machine interface (HMI) 134, a gear shifter 136, an engine 138, a transmission/gearbox 140 (hereinafter referred to as the gearbox 140). While not shown explicitly, the hardware components 132 may be coupled to each other mechanically and/or electronically.

The communication modules 114 may communicate with the PBBM 108, which in turn communicates with the ABM 106 to control the EPB 104. Further details of each of the communication modules 114 that are coupled to and communicate with the PBBM 108 for controlling the EPB 104 are provided below. Each of the communication and control modules 114 may include one or more memories and one or more processors configured to execute software instructions included in the memories.

The GSM 116 may be adapted to receive signals or information related to a gear shift and/or change. The GSM 116 may receive signals from the gear shift 136 indicating a current gear selected by the user. The GSM 116 can provide data related to the current state of the gear shift 136 to other communication and control modules 114.

In one example, the GSM 116 receives a signal indicating that the user has operated the gear shift 136 to place the vehicle 200 in park. The GSM 116 provides data to the PBBM 108 and/or to the control module 144 indicating that the user has placed the gear shift 136 in park. The PBBM 108 can use this information to determine whether to cause the ABM 106 to activate the EPB 104.

In one embodiment, the control module 144 is coupled to the motor 138 and the transmission 140. The control module 144 can receive signals from the motor 138 and the gearbox 140. The control module 144 can provide signals to the motor 138 and the gearbox 140. The control module 144 can also send and receive signals from other communication and control modules 114.

In one embodiment, the control module 144 receives inputs from one or more sensors (not illustrated) that are located at various locations in the vehicle 100. The sensors may include, for example, a gyroscope and an accelerometer. The inputs received from the sensors are used to determine the engine performance of the vehicle 100. Based on the received inputs, the control module 144 may control the acceleration of the vehicle 100 and/or decide whether to propel the vehicle 100 using an internal combustion engine, a battery pack, or a combination thereof.

The HPCM 120 may be used in a hybrid vehicle to control and monitor the operations of the hybrid powertrain system. The HPCM 120 generates torque and speed outputs to a driveline. Further, the HPCM 120 monitors and determines the condition of gears of the vehicle 100.

The GWM 122 is capable of unpacking and packing data from different networks and modules. The GWM 122 functions as an interface between different networks and connects different CAN networks (such as CAN1 110 and CAN2 112) with different baud rates and protocols. The GWM may integrate one network with different network types, such as with Ethernet.

The BCM 124 may control various lighting or door systems of the vehicle 100. For example, the BCM 124 controls the headlights and brake lights of the vehicle 200. The BCM 124 may also control other electrical aspects of the vehicle 200.

The vehicle 100 further includes an EPB switch 126. The EPB switch 126 may directly communicate with the ABM 106 to change the parking state of the EPB 104. In other words, the EPB switch 126 provides a signal to the ABM 106 indicating the application of the parking brake. Upon receiving the signal, the ABM 106 generates and sends a command to the PBBM 108 and, in response, the PBBM 108 provides another command to the ABM 106 for causing the ABM 106 to activate the EPB 104. In one example, the EPB switch 126 may couple to the PBBM 108 such that application of the parking brake may trigger the PBBM 108 to generate a command. The command is then delivered to the ABM 106, which activates the EPB 104.

As may be seen in FIG. 2, the communication and control modules 114 are coupled to the PBBM 108 via the first controller area network CAN1 110 and the second controller area network CAN2 112. In addition to the two CANs 110 and 112, the vehicle 200 includes a third controller area network 128 (hereinafter referred to as CAN3 128) and a fourth controller area network 130 (hereinafter referred to as CAN4 130).

In one example, the CAN1 110 and CAN4 130 are high-speed CAN buses, the CAN2 112 is a dedicated CAN bus, and the CAN3 128 is a private CAN bus. Each of the CAN buses are electrically coupled to each other and to the communication modules 114 through a wired connection, for example. Those skilled in the art will understand that the one or more CAN bus may use a suitable wireless communication to couple and communicate with the communication and control modules 114. The details pertaining to the communication network that allows each CAN 110, 112, 128 and 130 to couple and communicate with the communication modules 114 are explained in FIG. 4.

In one embodiment, the communication and control modules 114 communicate with each other to control the parking state of the EPB 104 via the PBBM 108. The GSM 116 is communicatively coupled to the PBBM 108 through the CAN1 110 and the CAN2 112. In addition, the GSM 116 communicates with the control module 144 via the CAN3 128, where the control module 144 includes the PCM 118 and the HPCM 120. The control module 144 may also communicate with the GWM 122 over the CAN4 130. Similar to the GSM 116, the GWM 122 may communicate with the PBBM 108 via the CAN1 110 and the CAN2 112.

In this example, the GSM 116 may communicate with the PBBM 108 via the control module 144 if at least the CAN3 128 or the CAN4 130 are available. However, if the CAN3 128 and the CAN4 130 are not available, the GSM 116 is configured to communicate with the PBBM 108 via the CAN1 110. Furthermore, if the CAN1 110, along with the CAN3 128 and CAN4 130, are unavailable, then the GSM 116 is configured to communicate with the PBBM 108 through the CAN2 112. Therefore, the usage of CAN1 110, CAN2 112, CAN3 128, and CAN4 130 for communication between the modules allows a fail-safe communication, thereby reducing the chances of failure to activate the EPB 104.

In one embodiment, the HMI 134 may receive inputs from the user. In one embodiment, the HMI 134 receives inputs corresponding to the gear selection for the vehicle 100. The HMI 134 may be a touch screen display device or another device that allows the user to input commands. In an embodiment, the HMI 134 includes a graphical representation of the gear shifter and displays a selection of available gear transmissions or gears. In this case, a physical gear shifter 136 may not be present in the vehicle 200.

In one embodiment, the gear shifter 136 is a physical mechanism that enables the user to switch the current gear of the vehicle 200. The gear shifter 136 can include a lever, a knob, a button, or another type of physical mechanism. The user can manipulate the physical mechanism to select a gear for the vehicle 200.

The motor 138 is used to drive the rear wheels 102 and/or the front wheels 142 of the vehicle 100, thereby allowing movement of the vehicle 100 on the road surface. The vehicle 200 may include a suitable motor 138, such as, an internal combustion engine and/or an electric motor and a battery for driving the vehicle 100.

The transmission 140 can include an assembly of gears. The gears transmit power from the motor 138 to a driveshaft (not shown) of the vehicle 200. The transmission 140 can include a gearbox. The transmission 140 can be coupled to the gear shift 136 such that the transmission 140 engages a gear, a set of gears, or no gear at all (neutral, park) in accordance with the gear selected by the user via the gear shift 136.

The one or more hardware components 132 may be electrically coupled to corresponding communication modules 114. The electrical connection may include a hard-wired connection. In the shown embodiment, the gear shifter 136 is coupled to the gear shifter module (GSM) 116, the motor 138 is coupled to the PCM 118, the transmission/gearbox 140 is coupled to the HPCM 120, and the EPB 104 is coupled to the ABM 106. Other connections, hardware components 132, and communication and control modules 114 can be utilized without departing from the scope of the present disclosure.

The coupling between the hardware modules 132 and the communication modules 114 may allow a two-way communication between the modules 132 and 114. In other words, the hardware modules 132 and the communication modules 114 work in tandem with each other to perform on or more operations of the vehicle 100. Further details regarding how the communication modules 114 coordinate and communicate with the hardware modules 132 to achieve various parking states of the EPB 104 are presented below.

In one example, the HMI 134 receives an input related to a change in gear of the vehicle 100 to park and provides the input to the GSM 116. Upon receiving the input from the HMI 134, the GSM 116 generates and sends a signal or command to the PBBM 108 through one or more of the CAN1 110, the CAN3 128, the CAN4 130, or the CAN2 112. The PBBM 108 includes decision-making features for analyzing the signal or command received from the GSM 116. The PBBM 108, based on the signal or command received from the GSM 116, sends another signal or command to the ABM 106. Based on the command received from the PBBM 108, the ABM 106 sends yet another signal or command to the EPB 104 to perform a parking operation. The EPB 104 may be connected to the ABM 106 through a hard-wired connection. Upon receiving the command from the ABM 106, the EPB 104 applies brakes to the rear wheels 102.

In another example, a driver switches the ignition off, and further unbuckles a seat belt. After detecting the ignition is switched off and the seatbelt is unbuckled, the PCM 118 or the HPCM 120, along with the BCM 124, provides signals to the GSM 116 to shift transmission of the vehicle 100 to park state. The GSM 116 generates and sends signals to the PBBM 108 based on the signals from the PCM 118 or the HPCM 120 via the BCM 124. Upon receiving the signals from the GSM 116, the PBBM 108 determines that the EPB should be activated and sends a signal or command to the ABM 106 to activate the parking brake state of the EPB 104.

Figure 3:
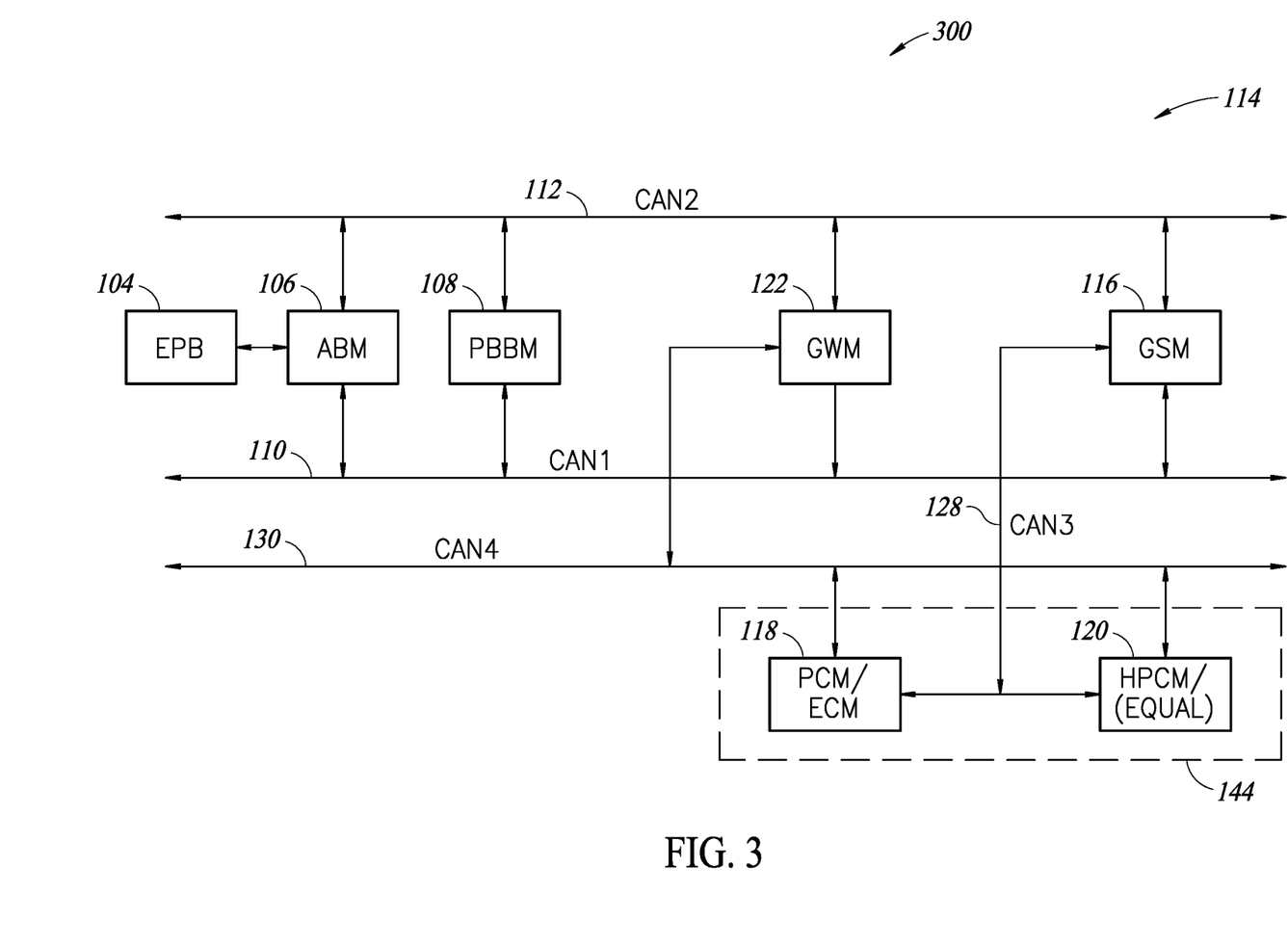
FIG. 3 is a block diagram of a vehicle, according to one embodiment of the present disclosure.

FIG. 3 is a block diagram providing a CAN architecture 300 of a vehicle, according to one embodiment. The CAN architecture 300 includes one or more high-speed CAN buses (e.g., CAN1 110 and CAN4 130), a private CAN bus (e.g., CAN3 128), and a dedicated CAN bus (e.g., the CAN2 112). The CAN architecture 300 allows the one or more communication modules 114 (as shown in FIG. 2) to communicate with each other.

As discussed with respect to FIGS. 1 and 2, the PBBM 108 is employed to receive commands from the communication modules 114. The received commands are analyzed by the PBBM 108 to decide if there is a need to activate or deactivate the EPB 104. Conventional CAN architectures may include only a single CAN bus. Typically, the high-speed CAN buses and the private CAN bus of the CAN architecture 300 are also involved in general communication between the communication modules 114 of the vehicle 100. Therefore, it may happen that one or more of these CAN buses may not be available or may be in a fault condition. As a result, the conventional CAN architecture may fail to communicate with the PBBM 108 to transition the parking state of the EPB 104. The CAN architecture 300 of FIG. 3 ensures that communication between communication and control modules 114 can continue even if one or more CAN buses are unavailable.

To solve this problem, the present disclosure provides a dedicated CAN, CAN2 112 that can allow direct communication of the communication modules 114 with the PBBM 108. For instance, as shown in FIG. 3, the GSM 116 may communicate directly with the PBBM 108 using the dedicated CAN, for example, CAN2 112. In addition, the control module 144, such as the PCM 118 and the HPCM 120, may also communicate with the PBBM 108 via the CAN2 112. Therefore, the dedicated CAN, i.e., CAN2 112, ensures that the PBBM 108 receives commands even if the other CAN buses, that is, CAN1 110, CAN3 128, and CAN4 130 are not available.

As shown, the GSM 116, the GWM 122, the PBBM 108, and the ABM 106 are coupled through the CAN1 110 and the CAN2 112. The control module 144, including the PCM 118 and/or the HPCM 120, is coupled to the GSM 116 using the CAN3 128. The control module 144, including the PCM 118 and the HPCM 120, are coupled to the GWM 122 using the CAN4 130. The PBBM 108 is configured to communicate with the ABM 106 via the CAN1 110. However, if the CAN1 110 is not available for communication, the PBBM 108 is configured to communicate with the ABM 106 via the CAN2 112.

Further, the GSM 116 is coupled to the PBBM 108 via the CAN1 110 and the CAN2 112. The GSM 116 is configured to communicate, at least in part, with the PBBM 108 via the CAN2 112 in response or due to a fault condition in the CAN1 110 or non-availability of the CAN1 110. The GSM 116 is configured to communicate with the PBBM 108 through the CAN1 110 or the CAN2 112 if the CAN3 128 and the CAN4 130 are in the fault condition or not available for communication. Further, the GSM 116 is configured to communicate with the PBBM 108 via the CAN2 112 if the CAN1 110, the CAN3 128, and the CAN4 130 are in a fault condition or unavailable for communication.

The GWM 122 is coupled to the PBBM 108 and the GSM 116 by both the CAN1 110 and the CAN2 112. The GSM 116 is configured to communicate with the PBBM 108 via the PCM 118 or the HPCM 120 if at least one of the CAN3 128 and the CAN4 130 is functional and available for communication. The GSM 116 is configured to communicate with the PBBM 108 via the CAN1 110 if the CAN3 128 and the CAN4 130 are in a fault condition or if the CAN3 128 and the CAN4 130 are not available for communication.

In one example, the PBBM 108 sends a first signal or command to the ABM 106 via one of the CAN1 110 and the CAN2 112. The PBBM 108 sends the first command via the CAN1 110 if the CAN1 110 is available. However, if the CAN1 110 is in the fault condition, then the PBBM 108 sends the first command via the CAN2 112. The first command is a control signal to the ABM 106 for activating or deactivating the EPB 104. In response to the first signal or command, the ABM 106 sends a second signal or command to the EPB 104. The second signal or command is a control signal to the EPB 104 that activates or deactivates the EPB 104.

The GSM 116 generates and sends a third command based on a command from the HMI 134 and the gear shifter 136. The GSM 116 sends the third command via the CAN1 110, if the CAN1 110 is not in a fault condition or is available for communication. The GSM 116 sends the third signal or command via the CAN2 112, if the CAN1 110 is unavailable. The GSM 116 sends the third signal or command to the control module 144 via the CAN3 128, if the CAN3 128 is not in a fault condition and is available. However, if the CAN3 128 is unavailable for communication and if the CAN4 130 is available for communication, then the GSM 116 sends the third signal or command to the GWM 122 via CAN4 130. Further, based on the received third signal or command, the GWM 122 sends a fourth signal or command to the control module 144 via the CAN4 130 if the CAN3 128 is unavailable.

The CAN architecture 300 ensures that signals or commands from the GSM 116 and the one or more other communication and control modules arrive at the PBBM 108. The CAN2 112 is a dedicated CAN bus that provides the signals to the PBBM 108 in spite of failure of one or more CAN buses such as the CAN1 110, the CAN3 128, and the CAN4 130. Therefore, the CAN architecture in the vehicle 100, as illustrated in FIG. 3, maintains communication for the PBBM 108 in all the possible failure mode cases and malfunctions. This ensures fail-safe application of the parking brakes or fail-safe parking operations.

The initiation of the parking operation is not limited to manual inputs from the user. The PBBM 108 is capable of receiving signals from multiple modules of the vehicle 100 using the CAN architecture 300. Based on the commands that the PBBM 108 receives, the PBBM 108 decides to activate or deactivate the EPB 104.

Figure 4:
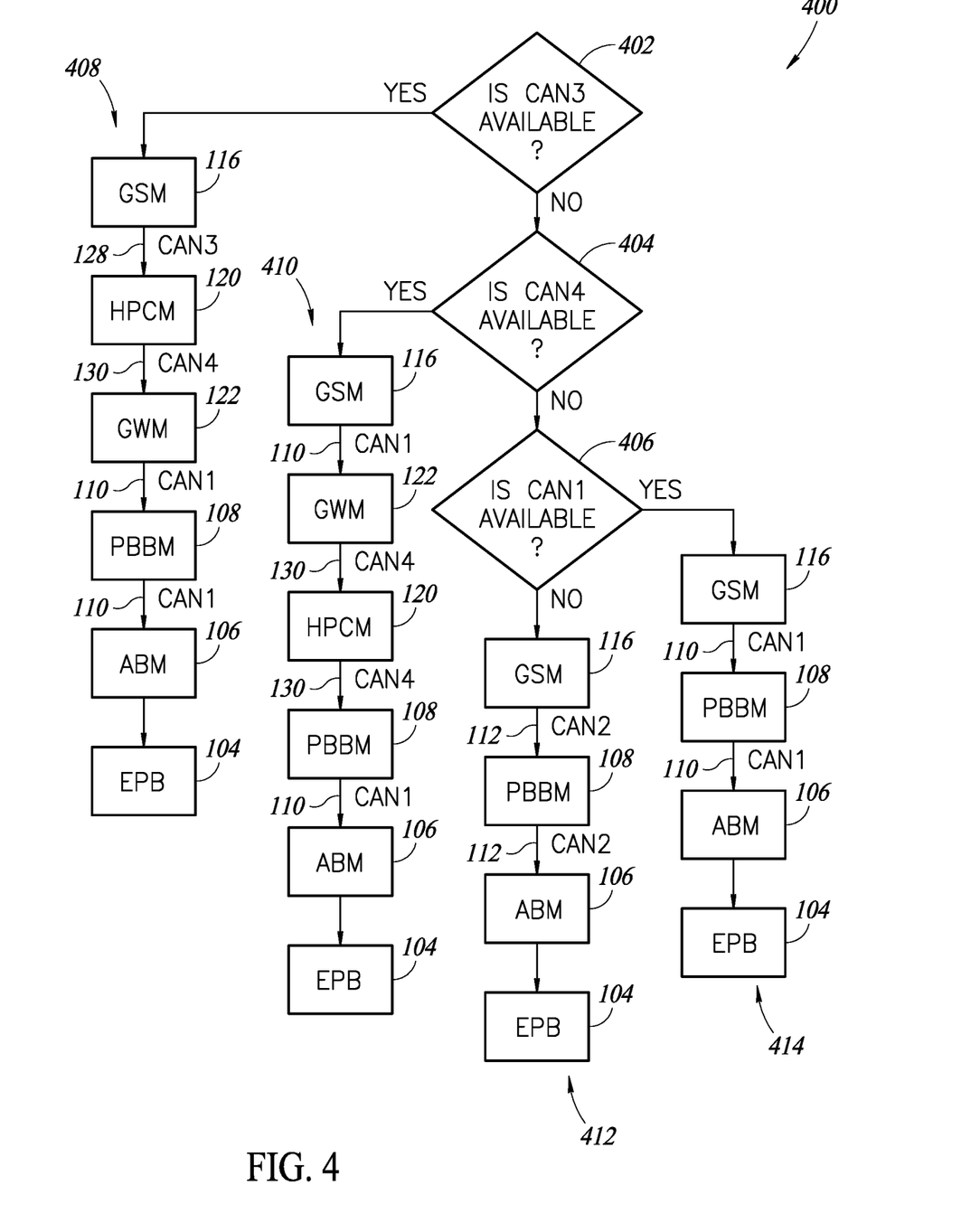
FIG. 4 is a flow diagram illustration of signal transmission paths of a vehicle, according to one embodiment of the present disclosure.

FIG. 4 is a flow diagram 400 illustrating the implementation of the CAN architecture of FIG. 3 in the vehicle 100, according to one embodiment. In particular, the flow diagram 400 of FIG. 4 depicts an example flow of communication between the one or more communication and control modules 114 based on availability. Communication between the various communication and control modules 114, as described in relation to FIG. 4, can include receiving signals and passing them on. Communication between the various communication and control modules 114, as described in relation to FIG. 4, can include receiving signals, generating new signals based on the received signals, and passing the new signals to another communication and control module 114. Communication between the various communication and control modules 114, as described in relation to FIG. 4, can include receiving signals, bundling additional signals with the received signals, and passing the bundled signals to another communication and control module 114.

Under normal working conditions of the CAN architecture (as shown in FIG. 3), the vehicle would check the availability of the private CAN, i.e., CAN3 128, at step 402. If the CAN3 128 is available, an input signal received from the one or more hardware components 132 of the vehicle 100 may follow a first communication route 408. In the first communication route 408, the GSM 116 communicates with the HPCM 120 over the CAN3 128. The HPCM 120 may then communicate with the GWM 122 via the CAN4 130. The GWM 122 may then communicate with the PBBM 108 through the CAN1 110. The PBBM 108 then analyzes the received signals to decide whether to change the parking state of the EPB 104. Accordingly, the PBBM 108 generates a signal or command that is delivered to the ABM 106 via the CAN1 110. The ABM then generates a signal or command and passes it to the EPB 104, thereby activating or deactivating the EPB 104.

At step 402, if the CAN3 128 is found unavailable, the vehicle may check for the availability of CAN4 130 at step 404. If the CAN4 130 is found available, communication flow follows a second communication route 410. In the second communication route 410, the GSM 116 communicates with the GWM 122 via the CAN1 110. The GWM 122 then passes signals to the HPCM 120 via the CAN4 130. The HPCM 120 may then send signals to the PBBM 108 through the CAN4 130. The PBBM 108 then analyzes the received signals to decide whether to change the parking state of the EPB 104. Accordingly, the PBBM 108 generates a signal that is delivered to the ABM 106 through the CAN1 110. The ABM then generates a signal or command and passes it to the EPB 104, thereby activating or deactivating the EPB 104.

At step 404, if the CAN4 130 is found unavailable, the vehicle may check for the availability of CAN1 110 at step 406. If the CAN1 110 is found available, communication flow follows a third communication route 412. In the third communication route, the GSM 116 directly communicates with the PBBM 108 over the high-speed CAN bus, i.e., CAN1 110. The PBBM 108 then analyzes the received signals to decide whether to change the parking state of the EPB 104. Accordingly, the PBBM 108 generates a signal that is delivered to the ABM 106 through the CAN1 110. The ABM then generates a signal or command and passes it to the EPB 104, thereby activating or deactivating the EPB 104.

At step 406, if the CAN1 110 is found unavailable, communication flow follows a fourth communication route 414. In the fourth communication route, the GSM 116 directly communicates with the PBBM 108 over the dedicated CAN bus, i.e., CAN2 112. The PBBM 108 then analyzes the received input signals to decide whether to change the parking state of the EPB 104. Accordingly, the PBBM 108 generates a signal or command that is delivered to the ABM 106 through the same dedicated bus, i.e., CAN2 112. The ABM then generates a signal or command and passes it to the EPB 104, thereby activating or deactivating the EPB 104.

It may be understood that the signals generated by the PBBM 108 and/or the ABM 106 may include one or more signals that are generated based on the signals shared by the one or more communication modules 114 of the vehicle 100. Further, the signals shared by the communication modules 114 may correspond to the operation of one or more hardware components 132 of the vehicle 100. For instance, the user may apply the EPB switch 126 that delivers a signal corresponding to the need of changing the parking state of the EPB 104. The signal may be a control signal that allows the PBBM 108 to generate another signal and/or command to control the ABM 106 to apply the parking brake.

Figure 5:
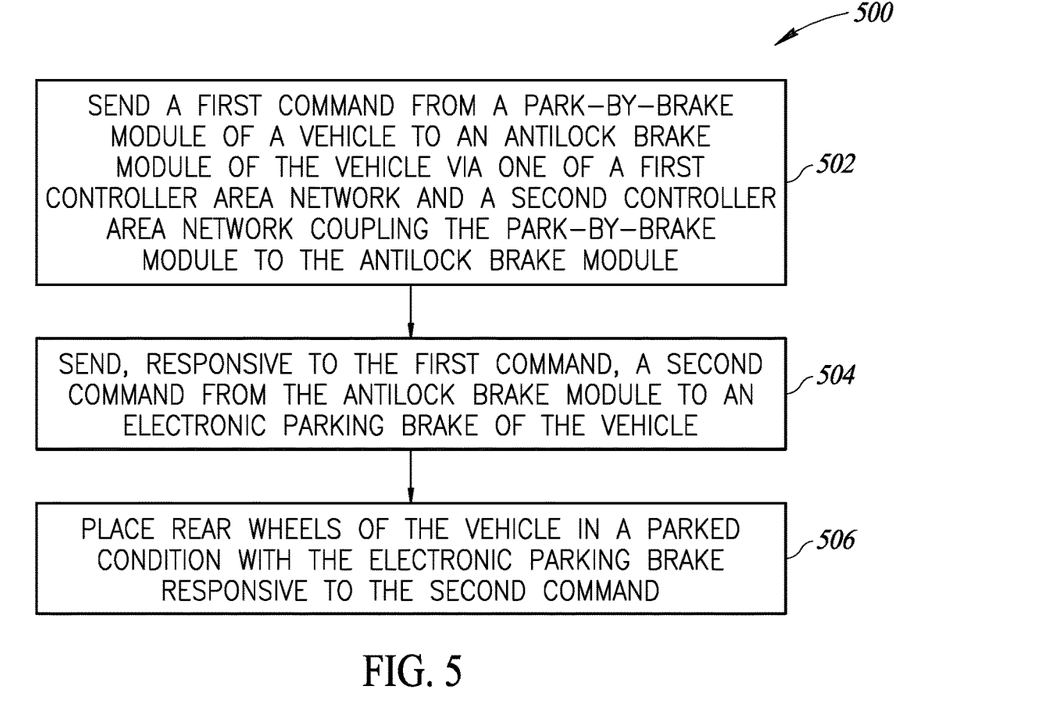
FIG. 5 is a flow diagram of a process for operating a vehicle, according to one embodiment of the present disclosure.
Figure 6:
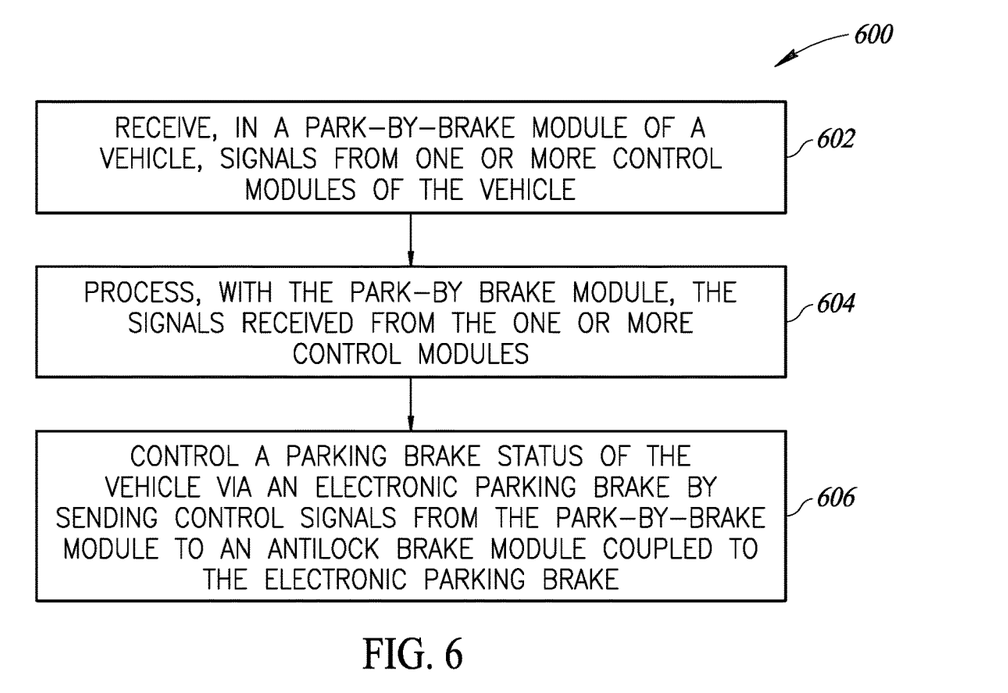
FIG. 6 is a flow diagram of a process for operating a vehicle, according to one embodiment of the present disclosure.

FIGS. 5 and 6 illustrate two preferred methods of operating a vehicle, according to embodiments of the present disclosure. The methods described below may be carried out using the configurations illustrated in FIGS. 1 through 4, and various elements of these figures are referenced in explaining example methods shown in the subsequent two figures. Each step shown in FIGS. 5 and 6 represents one or more processes, methods or subroutines, carried out in the example methods 500 and 600. Furthermore, the illustrated order of steps is illustrative only, and the order of the steps may change according to the present disclosure. Additional steps may be added or fewer steps may be utilized, without departing from the scope of the present disclosure.

At 502, the method 500 includes sending a first command from a park-by-brake module of a vehicle to an antilock brake module of the vehicle via one of a first controller area network and a second controller area network coupling the park-by-brake module to the antilock brake module. At 504, the method 500 includes sending, responsive to the first command, a second command from the antilock brake module to an electronic parking brake of the vehicle. At 506, the method 500 includes placing rear wheels of the vehicle in a parked condition with the electronic parking brake responsive to the second command.

FIG. 6 is a method 600 for implementing an electronic parking brake, according to one embodiment. At 602, the method includes receiving, in a park-by-brake module of a vehicle, signals from one or more control modules of the vehicle. At 604, the method 600 includes processing, with the park-by-brake module, the signals received from the one or more control modules. At 606, the method 600 includes controlling an electronic parking brake by sending control signals from the park-by-brake module to an antilock brake module coupled to the electronic parking brake.

In one embodiment, a vehicle includes rear wheels, an electronic parking brake coupled to the rear wheels, and an antilock brake module coupled to the electronic parking brake and configured to control the electronic parking brake. The vehicle includes a first controller area network, a second controller area network, and a park-by-brake module coupled to the antilock brake module by the first controller area network and by the second controller area network.

In one embodiment, the park-by-brake module is configured to communicate with the antilock brake module via the first controller area network. The park-by-brake module can communicate with the antilock brake module via the second controller area network if the first controller area network is not available. The second controller area network is dedicated for ensuring that the park-by-brake module can cause the antilock brake module to control the electronic parking brake. The antilock brake module is configured to control the electronic parking brake responsive to signals received from the park-by-brake module.

The vehicle can include a motor, a gear shifter coupled to the motor, and a gear shift module coupled to the gear shifter and coupled to the park-by-brake module by the second controller area network. The gear shifter is coupled to the gear shift module by a wired connection. The gear shift module is configured to receive a signal indicative of a state of the gear shifter. The gear shift module is coupled to the park-by-brake module via the first controller area network and the second controller area network. The gear shift module is configured to communicate with the park-by-brake module via the second controller area network responsive, at least in part, to the first controller area network being unavailable.

In one embodiment, the vehicle includes a gateway module coupled to park-by-brake module and the gear shift module by both the first controller area network and the second controller area network, a third controller area network, and a fourth controller area network. The vehicle includes a control module coupled to the gear shift module via the third controller area network and coupled to the gateway module via the fourth controller area network. The control module includes at least one of an engine control module, a powertrain control module, and a hybrid powertrain control module. The gear shift module is configured to communicate with the park-by-brake module via the control module if at least one of the third and fourth controller area networks is available. The gear shift module is configured to communicate with the park-by-brake module via the first controller area network if the third and fourth controller area networks are not available. The gear shift module is configured to communicate with the park-by-brake module via the second controller area network if the first, third, and fourth controller area networks are not available.

In one embodiment, the park-by-brake module is configured to decide whether to control the antilock brake module to activate the electronic parking brake based on data from the control module and the gear shift module.

In one embodiment, the park-by-brake module includes a first memory configured to store first software instructions and a first processor configured to execute the first software instructions. The antilock brake module includes a second memory including second software instructions and a second processor configured to execute the second software instructions.

In one embodiment, a method includes sending a first command from a park-by-brake module of a vehicle to an antilock brake module of the vehicle via one of a first controller area network and a second controller area network coupling the park-by-brake module to the antilock brake module. The method includes sending, responsive to the first command, a second command from the antilock brake module to an electronic parking brake of the vehicle. The method includes placing rear wheels of the vehicle in a parked condition with the electronic parking brake responsive to the second command.

In one embodiment, the method includes sending the first command via the first controller area network if the first controller area network is available and sending the first command via the second controller area network if the first controller area network is not available. The method includes sending a third command from a gear shift module of the vehicle and sending the first command based, at least in part, on the third command.

In one embodiment, the method includes sending the third command via the first controller area network if the first controller area network is available and sending the third command via the second controller area network if the first controller area network is not available.

In one embodiment, the method includes sending the third command to a control module of the vehicle via a third controller area network of the vehicle if the third controller area network is available and sending the third command to a gateway module if the third controller area network is not available and a fourth controller area network of the vehicle is available. The method includes sending a fourth command from the gateway module to the control module via the fourth controller area network if the third controller area network is not available and the fourth controller area network is available.

In one embodiment, the method includes sending the third command from the gear shift module to the park-by-brake module by either the first controller area network or the second controller area network if the third and fourth controller area networks are not available.

In one embodiment, a method includes receiving, in a park-by-brake module of a vehicle, signals from one or more control modules of the vehicle, processing, with the park-by-brake module, the signals received from the one or more control modules, and controlling an electronic parking brake by sending control signals from the park-by-brake module to an antilock brake module coupled to the electronic parking brake.

In one embodiment, the method includes sending the control signals from the park-by-brake module to the antilock brake module via a dedicated controller area network if a first controller area network is in a fault condition.

In one embodiment, the method includes sending the control signals from the park-by-brake module to the antilock brake module via the first controller area network if the first controller area network is not in the fault condition.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
 rear wheels;
 an electronic parking brake coupled to the rear wheels;
 an antilock brake module coupled to the electronic parking brake and configured to control the electronic parking brake;
 a first controller area network;
 a second controller area network; and a park-by-brake module coupled to the antilock brake module by the first controller area network and by the second controller area network, wherein the park-by-brake module sends a first signal to the antilock brake module, and wherein the antilock brake module sends a second signal to the electronic parking brake to apply the electronic parking brake to the rear wheels responsive to receiving the first signal.

2. The vehicle of claim 1, wherein the park-by-brake module is configured to communicate with the antilock brake module via the first controller area network.

3. The vehicle of claim 2, wherein the park-by-brake module is configured to communicate with the antilock brake module via the second controller area network if the first controller area network is not available.

4. The vehicle of claim 3, wherein the second controller area network is dedicated for ensuring that the park-by-brake module can cause the antilock brake module to control the electronic parking brake.

5. The vehicle of claim 4, wherein the antilock brake module is configured to control the electronic parking brake responsive to receiving the first signal from the park-by-brake module.

6. The vehicle of claim 4, further comprising:
a motor;
a gear shifter coupled to the motor; and
a gear shift module coupled to the gear shifter and coupled to the park-by-brake module by the second controller area network.

7. The vehicle of claim 6, wherein the gear shift module is configured to receive a third signal indicative of a state of the gear shifter.

8. The vehicle of claim 7, wherein the gear shift module is coupled to the park-by-brake module via the first controller area network and the second controller area network.

9. The vehicle of claim 7, wherein the park-by-brake module is configured to decide whether to control the antilock brake module to activate the electronic parking brake based on data from the control module and the gear shift module.

10. The vehicle of claim 1, wherein the park-by-brake module includes:
a first memory configured to store first software instructions; and
a first processor configured to execute the first software instructions.

11. The vehicle of claim 10, wherein the antilock brake module includes:
a second memory including second software instructions; and
a second processor configured to execute the second software instructions.

12. A method, comprising:
sending a first command from a park-by-brake module of a vehicle to an antilock brake module of the vehicle via one of a first controller area network and a second controller area network coupling the park-by-brake module to the antilock brake module;

sending, responsive to receiving the first command from the park-by-brake module, a second command from the antilock brake module to an electronic parking brake of the vehicle; and placing rear wheels of the vehicle in a parked condition with the electronic parking brake responsive to receiving the second command from the antilock brake module.

13. The method of claim 12, further comprising:
sending the first command via the first controller area network if the first controller area network is available; and
sending the first command via the second controller area network if the first controller area network is not available.

14. The method of claim 12, further comprising:
sending a third command from a gear shift module of the vehicle; and
sending the first command based, at least in part, on the third command.

15. The method of claim 14, further comprising:
sending the third command via the first controller area network if the first controller area network is available; and
sending the third command via the second controller area network if the first controller area network is not available.

16. The method of claim 14, further comprising:
sending the third command to a control module of the vehicle via a third controller area network of the vehicle if the third controller area network is available;
sending the third command to a gateway module if the third controller area network is not available and a fourth controller area network of the vehicle is available; and
sending a fourth command from the gateway module to the control module via the fourth controller area network if the third controller area network is not available and the fourth controller area network is available.

17. The method of claim 16, further comprising sending the third command from the gear shift module to the park-by-brake module by either the first controller area network or the second controller area network if the third and fourth controller area networks are not available.

18. A method, comprising:
receiving, in a park-by-brake module of a vehicle, signals from one or more control modules of the vehicle;
processing, with the park-by-brake module, the signals received from the one or more control modules; and
controlling an electronic parking brake by sending a first signal from the park-by-brake module to an antilock brake module configured to send a second signal to the electronic parking brake.

19. The method of claim 18, further comprising sending the control signals from the park-by-brake module to the antilock brake module via a dedicated controller area network if a first controller area network is unavailable.

20. The method of claim 19, further comprising sending the control signals from the park-by-brake module to the antilock brake module via the first controller area network if the first controller area network is available.

* * * * *